United States Patent [19]

Kaufman et al.

[11] 4,393,616
[45] Jul. 19, 1983

[54] TRAP APPARATUS, AND METHODS OF FABRICATING AND UTILIZING SAME

[75] Inventors: Gilbert T. Kaufman, Flint; Alfred Evans, Swartz Creek, both of Mich.

[73] Assignee: Critter Getter, Inc., Flint, Mich.

[21] Appl. No.: 246,882

[22] Filed: Mar. 23, 1981

[51] Int. Cl.³ ............................................. A01M 23/18
[52] U.S. Cl. ......................................................... 43/60
[58] Field of Search ........................................ 43/60, 61

[56] References Cited

U.S. PATENT DOCUMENTS

| | | | |
|---|---|---|---|
| 2,485,319 | 10/1949 | Rosen | 43/61 |
| 2,663,116 | 12/1953 | Jones | 43/61 |
| 2,916,847 | 12/1959 | Murphy | 43/61 |
| 3,828,460 | 8/1974 | Herman | 43/61 |
| 4,142,320 | 3/1979 | Marcolina et al. | 43/61 |
| 4,144,667 | 3/1979 | Souza | 43/61 |
| 4,232,472 | 11/1980 | Muelling | 43/61 |

FOREIGN PATENT DOCUMENTS

| | | | |
|---|---|---|---|
| 59545 | 4/1891 | Fed. Rep. of Germany | 43/61 |
| 416594 | 10/1910 | France | 43/61 |

*Primary Examiner*—Nicholas P. Godici
*Assistant Examiner*—Charles L. Willis
*Attorney, Agent, or Firm*—Irving M. Weiner; Pamela S. Burt; John L. Shortley

[57] ABSTRACT

A device for live trapping of rodent and other small animals including a ramp up which the animal walks to reach a food pellet. Upon doing so the animal traps himself and cannot get out until released.

16 Claims, 5 Drawing Figures

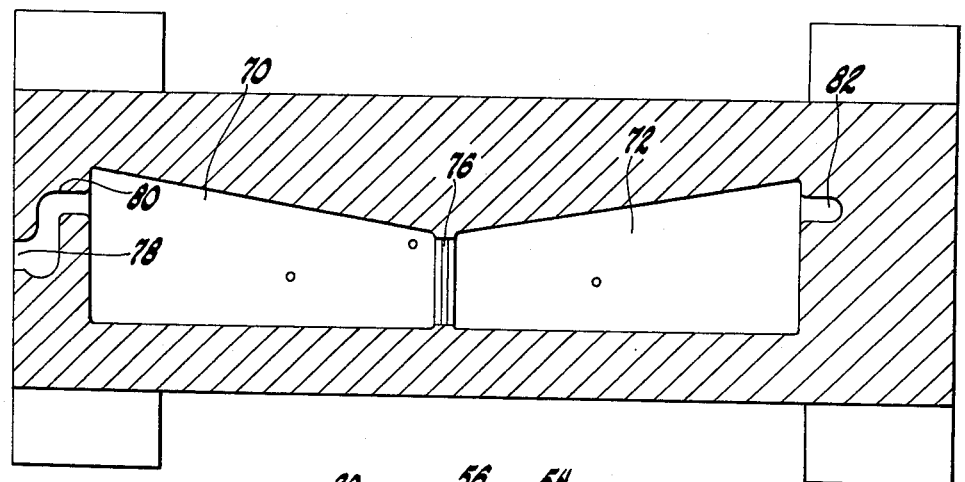
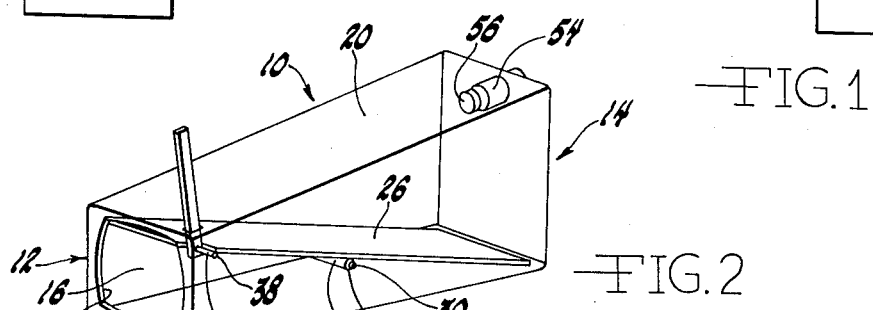
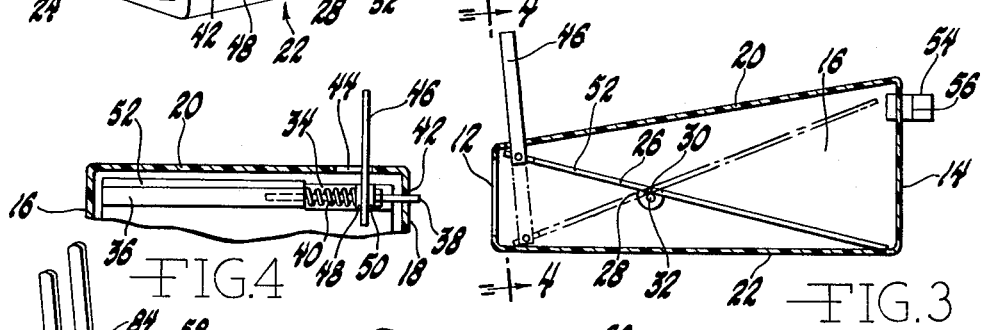
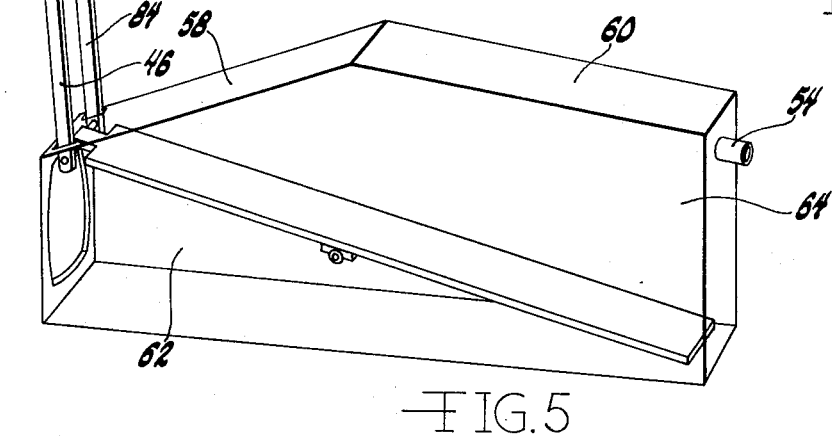

TRAP APPARATUS, AND METHODS OF FABRICATING AND UTILIZING SAME

BACKGROUND OF THE INVENTION

1. Field of the Invention

This invention relates to a trap for animals such as mice and other rodents as well as other animals up to about a size somewhat below that of the ordinary coyote. The invention provides means for live trapping, that is, the animal can be trapped within a device constructed in accordance with the invention without harm. Therefore, medical groups and others having an interest in receiving live animals can be benefited through the use of traps constructed in accordance with the invention.

There have been numerous devices conceived for live trapping of animals, i.e. for keeping animals alive until released or destroyed at some later time. Some of these are relatively complex in design, and are not only expensive, but subject to failure because of their complexity. Others, although less complex, are unreliable. Animals can easily escape from some of these. The instant invention provides animal traps which are of simple construction, and can be easily and economically produced. Further, according to the invention, a very reliable trap which can be easily maintained is provided.

Still further, the invention also contemplates a trap which can be molded, as well as a simple method of producing, i.e. molding, traps embodying features of the invention.

2. Description of the Prior Art

As stated above, numerous animal traps have been produced over the years and a number of these are designed to trap without harming the animal. The U.S. Pat. No. 3,828,460, to Herman Bowen, U.S. Pat. No. 730,434 and Lokaj, U.S. Pat. No. 1,323,399 are believed to be representative of previously known devices.

Herman, U.S. Pat. No. 3,828,460, granted in 1973, entitled "RODENT TRAP" shows an animal trap which is in the form of an elongated box-like container. The trap has an open forward end through which the mouse or other animal is to enter, and a closed rear end. There is a door, however, at the rear end which can be opened by the trapper to retrieve the animal. Within the container there is a pivotally mounted platform which extends a substantial part of the length of the trap. The platform can be made of wood or metal and has a pin which pivotally supports the platform substantially centrally of the box. A swinging lock is pivotally mounted on the underside of the platform. This lock comprises a metal strip or prop which is secured to the platform by a hinge pin-like construction. The point of connection by the hinge pin-like structure is forward of the pivotal point for the platform. The platform is arranged with its pivotal connection such that it normally has its forward end adjacent the opening to the chamber down against the floor of the chamber. The rear end is raised and approximately contacting the upper end of the chamber. The hole is arranged so that when food is located at the rear of the chamber an animal will be lured in, he will walk up the platform, go beyond the pivot point, and thus cause the platform to swing downwardly. When this happens, the prop which is connected to the platform swings to a vertical position and locks the platform in such a manner that the animal cannot get out.

Bowen U.S. Pat. No. 730,434 issued in 1903, entitled "ANIMAL TRAP", also discloses a box-like trap having a walkup platform over which the animal must move in order to reach bait placed near the rear of the box. The platform is designed, similarly to that shown in Herman, so that it normally is held with its forward end down adjacent the opening into the box. When the animal walks up the platform he eventually reaches a point in which he will cause the platform to pivot. In the case of the Bowen device however, the movement of the platform downwardly causes a front door to close, and by this means the animal is retained in the trap. There is an upper door through which the animal can be reched by the trapper.

Lokaj U.S. Pat. No. 1,323,399, granted in 1919, and entitled "MOUSE TRAP", also shows a box-like trap having a walk-up platform over which the animal must walk in order to reach the bait. Similarly, when the animal reaches the upper end of the platform he will over-balance the longer lower end at the front of the box, and pivot the platform about a pin which supports the platform within the trap. When this is done the animal can now move into another compartment and he can no longer get out of the trap.

These prior art devices, it will be noted, all involve front entrance doors and rear release doors which complicate and add to the cost of the trap.

SUMMARY OF THE INVENTION

The present invention provides a simple, easily constructed and easily maintained trap or the like unit. Further, the invention provides an indicator for the trap which will make it possible to determine from a distance whether an animal is in the trap or not. Thus the condition of the trap can be determined from a distance and it is not necessary to either closely approach a trap which might be transparent, or to pick up the trap which is not, before one can determine whether a creature is in it or not.

It is also a feature of the invention to provide a trap which can be formed as a single molded unit, which can be of transparent nature if desired, and which because of this can be inexpesively and easily manufactured. An additional advantage of the trap so constructed is that it is easy to maintain and can be easily cleaned.

Another feature of the invention is the provision of an indicator and a latching means which can be combined in such a manner as to further reduce the cost of the trap. In addition, this also contributes to the reliability of the unit.

According to the invention there is provided an animal trap having a housing forming an elongated chamber and having forward and rear walls. An opening is provided in the forward wall for entry of an animal to be trapped. A platform member within the chamber extends substantially the full length and width of the chamber, but is spaced from the walls of the chamber sufficiently to permit pivoting therein about a horizontal axis. The platform pivots from a first condition in which the platform slopes upwardly from the opening in the chamber to a second condition in which the platform slopes downwardly with respect to the inlet opening. There is means pivotally mounting the platform within the chamber at a point spaced along the platform whereby the platform can pivot about a horizontal axis.

An indicator is connected to the platform and is moveable thereby to indicate the position of the platform with respect to the chamber opening and to thus give an indication that an animal may or may not be trapped therein, depending upon the position of the indicator.

Also, according to the invention the indicator is an elongated member which extends substantially vertically within the chamber and is moveable in a substantially vertical plane. The indicator extends through an opening in the upper wall of the chamber and the extent of projection of the indicator is indicative of the condition of the chamber. When the platform is raised adjacent the opening the indicator projects above the chamber a substantial distance. When the platform is lowered adjacent the opening the indicator is at its lowermost position.

According to the invention there are means pivotally securing the indicator member to the platform. Further, according to the invention a locking device is attached to the platform which is operable to lock the platform when the animal has been trapped. The locking device is preferably positioned adjacent the front end of the platform and thus adjacent the entrance to the chamber. According to the invention the locking device comprises a detent member connected to the platform and moveable therewith from a first position to a second position. Further, there is an opening for the detent adjacent the second position of the detent member into which the detent member can be forced by a resilient means carried by the platform. By this means the detent serves as a lock and locks the platform into such a condition that the animal cannot escape.

Further, according to the invention the indicator and the detent member are combined in a manner such that the construction is simplified. According to the invention the detent member comprises a pin mounted in a support with the detent urging resilient means being positioned also within the support, and further the indicator device is mounted on and supported by the detent member pin.

Also, according to the invention, there is provided a trap which can be easily produced and further according to the invention there is provided a method of taking advantage of this feature.

According to the invention, the trap housing can be produced in pairs by molding. Thus, two trap housings can be produced at one time. Further, the traps thus constructed can have smooth inner surfaces and no projecting corners. As a result, an animal cannot easily chew his way out, as he is unable to get a hold of anything to get his teeth into. According to the invention the housings are formed with their inner openings abutting and with their rear faces being disposed at opposite ends of the mold. The sprue is formed so that material left in it when the paired members are removed forms one required feed pellet receiving opening of the trap. The other side of the mold is constructed so as to provide a projection for the second pellet opening. After the molding is accomplished the mold is split at the parting line, and the pair is separated by cutting right in the middle of the pair. This forms the two inlet openings and otherwise results in the formation of complete trap housings.

BRIEF DESCRIPTION OF THE DRAWINGS

FIG. 1 is a mold half for forming housings for the trap according to the invention.

FIG. 2 is a perspective view of a trap constructed in accordance with the invention.

FIG. 3 is a sectional side elevational view.

FIG. 4 is a fragmentary sectional view taken along line 4—4 of FIG. 3.

FIG. 5 is a view of another form of the trap constructed in accordance with the invention.

PREFERRED EMBODIMENT OF THE INVENTION

With reference to FIG. 2, a mouse trap according to the invention is preferably formed of a transparent thermosetting plastic which can be readily used in molding.

The trap comprises a housing 10, and the housing comprises a front end 12, a rear end 14, and sides 16 and 18, as well as a bottom and top section 20 and 22. Adjacent the front end there is an entrance 24.

Within the housing there is a platform 26. The platform is a substantially flat member and is sized so that it closely approaches the sides of the housing as well as the front and rear end. However it is dimensioned so that it can freely pivot within the chamber. For this purpose the platform has a bushing 28, and a pivot pin 30. The pin 30 extends through appropriate holes 32 in the sides of the housing. By this means the platform 26 is pivotally supported within the trap. The bushing is located forwardly of the midpoint of the platform for a reason which will become apparent hereinafter.

At its forward end the platform has a recess 34 cut therein and beneath this recess there is provided another bushing 36, see FIG. 4 particularly. Within this bushing there is supported a detent member lock pin 38 which extends outwardly to one side of the platform 26, and is normally urged against the side of the housing by a helical spring 40.

The platform 26 is adapted to pivot within the holes 32 in the sides of the housing, and thus the lock pin 38 moves in an arc about the point of pivotal connection. Adjacent the upper and forward end of the housing on the right-hand side as viewed in FIGS. 2 and 4, there is provided an opening 42. This opening is in the path of movement of the lock pin as the platform pivots. When the platform pivots to the extent that the lock pin is opposite this opening the helical spring 40 will force the lock pin into the opening. When this occurs the pin will cause the platform to lock in this position until someone removes the lock pin from the opening 42.

Also, adjacent the upper and forward end of the housing there is provided a slot 44. Within this slot there is received an indicator 46. This indicator consists of substantially an elongated rod, and can be formed of the same material as the housing and the platform 26. The indicator has a suitable opening at its lower end through which the lock pin 38 can extend. By means of a pair of collars 48 and 50 the indicator is fixed in position on the lock pin 38. Thus, the indicator moves with the lock pin as it moves respectively into or out of the opening 42.

The indicator 46 is of a sufficient length that it will project upwardly through this slot 44 when the platform's front end 52 is at its lowermost position. Thus the indicator will also move within the slot 44 and will project through this slot at all times. When the indicator is raised to the uppermost position as shown in FIGS. 1 and 3 the indicator will project a substantially greater distance. Thus the indicator can be used to show the condition of the platform.

The two collars 48 and 50 lock the indicator 46 to the locking pin 38. Likewise the pin is locked to the indicator. Therefore, the indicator can be used for removing the lock pin 38 from the opening 42 when it is desired to lower the platform from its position indicated in solid lines in FIG. 3 to the dotted line position indicated in FIG. 3.

Adjacent the rear end 14 of the housing, there is provided a tube-like member 54. This tube projects rearwardly a sufficient distance to form a chamber for a food pellet 56. The opening extends inwardly to the chamber and the pellet can be inserted into the chamber through the tube 54. The length of the tube is such that the pellet can be pushed inwardly so it is disposed inwardly of the chamber, but it is so positioned that it cannot be reached from outside the chamber. Thus, a mouse will have to go into the chamber if he wants to get the pellet.

In use the platform is positioned in the dotted line position indicated in FIG. 3. In this position the indicator only projects a slight distance above the housing, but it is still within the slot so that when the platform is moved it will be in the proper position.

When the mouse or other animal enters the trap it will have to go up the ramp or platform to the rear in order to reach the pellet. When he does go towards the rear of the housing he will cause the platform to pivot to the solid line position illustrated in FIG. 3. In this position the locking pin 38 will be urged by the spring 40 into the opening 42. This will lock the platform in a position in which the mouse or the other animal is trapped. He can now only get out when someone has come along and released the latch.

FIG. 5 illustrates a larger form of a trap in which the housing comprises walls of greater length than that shown in FIGS. 1-3. According to this form of the invention the upper wall comprises a front section 58 and a rear section 60, and the side panels 62 and 64 are shaped to conform thereto. The rear and front panels are also of a larger size, conformable to the production of a larger housing, and the platform etc. are similarly of a size necessary to conform thereto. Otherwise the trap shown in FIG. 5 is of the same construction as that heretofore described in respect to FIGS. 2-4.

FIG. 1 shows a half of a mold in which the trap housings can be formed in pairs. With reference thereto it is seen that a pair of housings 70 and 72 can be formed in a single mold by designing the mold so that the forward ends of the housings, that is the entrance ends of the housings, will be in abutting relationship with the opposite ends spaced respectively to the left and right sides of the mold 74. A parting section 76 is provided centrally of the mold, and thus centrally of the two housings when they are formed. Sprue 78 is provided adjacent one end of the mold and through this means the desired molding material is introduced. As mentioned heretofore this material is preferably such that it will produce a transparent housing and can be any one of known thermosetting or thermoplastic materials depending upon the use to which the housing may be put.

The sprue is of a shape such that when the material introduced hardens within the sprue and forms the sprue-like section remaining, such as indicated at 80, it will serve as the tube-like section 54 of FIG. 3. That is, the sprue can be simply cut off adjacent the housing 70 in a manner that the pellet opening remains. At the opposite end of the mold there is provided a cavity 82 within which the other tube-like food pellet opening will be formed.

After the mold is separated and the resulting housings are exposed as indicated in FIG. 1, they can be removed and simply severed at the parting section 76. This will result in the provision of the entrance 24.

The bushing 28 and thus pin 30 are mounted forwardly of the midpoint of the housing to provide more reliable action than if the pin were at the midpoint, and to provide more room at the rear of the trap.

It should also be noted that duplicate locking pins, one on each side of the platform can be provided. Duplicate indicator-pin release members can be provided in such case, as indicated at 84, FIG. 5. It will be understood that duplicate openings 42, FIG. 4, and duplicate springs 40, collars 48 and 50, recess 34, and slots 44 can be provided for this purpose.

Although there have been described what are at present considered to be preferred embodiments of the invention, it will be understood that the invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

We claim:
1. An animal trap comprising:
a housing forming an elongated chamber and having forward and rear walls;
an opening in said forward wall for entry of an animal to be trapped;
a platform member within said chamber and extending substantially the full length and width of said chamber, but being spaced from the walls of said cahmber sufficiently to permit pivoting therein about a horizontal axis from a first condition in which said platform slopes upwardly from said opening to a second condition in which said platform slopes downwardly with respect to said opening;
means pivotally mounting said platform member within said chamber at a point spaced along said platform, whereby said platform can pivot about a horizontal axis;
an indicator mounted on said platform and moveable thereby to indicate the condition of said platform with respect to said opening and to thus give an indication that an animal may be trapped in said trap;
a locking device attached to said platform and operable to lock said platform in said second condition; and
said indicator operably cooperating with said locking device and being movable by a user of said trap to unlock said locking device in said second condition.
2. The animal trap of claim 1, wherein:
said indicator comprises an elongated member attached to said platform and moveable therewith.
3. The animal trap of claim 2, wherein:
said indicator extends substantially vertically and is moveable in a substantially vertical plane.
4. The animal trap of claim 1, including:
a projecting tube-like feed slot extending outwardly from the rear of said chamber above said platform.
5. The animal trap of claim 4, wherein:
said feed slot is of a size to accept a preformed food pellet through its open rear end whereby said food pellet can be positioned within said tube-like slot inwardly of its open end sufficiently to be accessible to an animal in the interior of said chamber but being inaccessible from the exterior thereof.
6. The animal trap of claim 5, wherein:

said tube-like slot comprises a projection of said chamber and is formed integrally therewith.

7. The animal trap of claim 1, wherein:
said chamber is formed of a molded material, and has smooth inner surfaces; and
said chamber is transparent.

8. The animal trap of claim 1, wherein:
said locking device is attached to the forward end of said platform member; and
said indicator is connected to said forward end of said platform member by means of said locking device.

9. The animal trap of claim 8, wherein:
said indicator extends substantially vertically and is moveable in a substantially vertical plane from a lowered position thereof to a raised position thereof to give said indication of a trapped animal.

10. The animal trap of claim 9, wherein:
said locking device is engageable with an opening provided in said housing so as to lock said platform in said second condition; and
said indicator is horizontally movable in said raised position thereof so as to unlock said locking device by disengagement thereof from said opening in said housing.

11. An animal trap comprising:
a housing forming an elongated chamber and having forward and rear walls;
an opening in said forward wall for entry of an animal to be trapped;
a platform member within said chamber and extending substantially the full length and width of said chamber, but being spaced from the walls of said chamber sufficiently to permit pivoting therein about a horizontal axis from a first condition in which said platform slopes upwardly from said opening to a second condition in which said platform slopes downwardly with respect to said opening;
means pivotally mounting said platform member within said chamber at a point spaced along said platform, whereby said platform can pivot about a horizontal axis;
an indicator connected to said platform and moveable thereby to indicate the condition of said platform with respect to said opening and to thus give an indication that an animal may be trapped in said trap;
said indicator comprising an elongated member attached to said platform and moveable therewith;
means forming an opening in the upper wall of said chamber; and
said indicator projecting through said opening and being moveable vertically therethrough upon movememnt of said platform.

12. The animal trap of claim 11, including:
means pivotally securing said indicator member to said platform with said member projecting through said opening in the upper wall of said chamber and being of a length greater than the height of said chamber.

13. An animal trap comprising:
a housing forming an elongated chamber and having forward and rear walls;
an opening in said forward wall for entry of an animal to be trapped;
a platform member within said chamber and extending substantially the full length and width of said chamber, but being spaced from the walls of said chamber sufficiently to permit pivoting therein about a horizontal axis from a first condition in which said platform slopes upwardly from said opening to a second condition in which said platform slopes downwardly with respect to said opening;
means pivotally mounting said platform member within said chamber at a point spaced along said platform, whereby said platform can pivot about a horizontal axis;
an indicator connected to said platform and moveable thereby to indicate the condition of said platform with respect to said opening and to thus give an indication that an animal may be trapped in said trap;
a locking device attached to said platform and operable to lock said platform in said second position;
said locking device comprising a detent member connected to said platform and moveable therewith from a first position to a second position;
an opening for said detent member positioned in alignment with said detent member, when said detent member is in said second position; and
means for urging said detent member into said opening when in alignment therewith.

14. The animal trap of claim 13, wherein:
the latter means is a spring.

15. The animal trap of claim 13, wherein:
said detent member comprises a pin, and said indicator is supported on said pin.

16. The animal trap of claim 15, wherein:
said pin is mounted in a support therefor on said platform and said means urging said pin is a resilient means in said support.

* * * * *